United States Patent [19]

O'Connor et al.

[11] Patent Number: 5,097,485
[45] Date of Patent: Mar. 17, 1992

[54] HF HIGH DATA RATE MODEM

[75] Inventors: Roger J. O'Connor, Garden Grove; Khiem V. Cai, Brea, both of Calif.

[73] Assignee: Hughes Aircraft Company, Los Angeles, Calif.

[21] Appl. No.: 419,166

[22] Filed: Oct. 10, 1989

[51] Int. Cl.[5] .......................................... H04L 27/10
[52] U.S. Cl. ........................................ 375/56; 371/1
[58] Field of Search ................ 375/1, 52, 56, 67, 83, 375/84, 115; 455/110, 205; 332/103; 329/304

[56] References Cited

U.S. PATENT DOCUMENTS

| | | | |
|---|---|---|---|
| 3,758,870 | 9/1973 | Schmitt et al. | 375/8 X |
| 3,809,817 | 5/1974 | Gill et al. | 375/56 |
| 4,271,524 | 6/1981 | Goodman et al. | 375/1 |
| 4,320,514 | 3/1982 | Haskell | 375/58 |
| 4,355,399 | 10/1982 | Timor | 375/1 |
| 4,383,323 | 5/1983 | Timor | 375/1 |
| 4,392,231 | 7/1983 | Henry | 375/80 |
| 4,481,640 | 11/1986 | Chow et al. | 375/56 |
| 4,583,231 | 4/1986 | Puckette | 375/51 |
| 4,800,363 | 1/1989 | Braun et al. | 375/37 |

Primary Examiner—Stephen Chin
Attorney, Agent, or Firm—Wanda K. Denson-Low

[57] ABSTRACT

Methods and apparatus for achieving high frequency (HF) modem communications. A predetermined plurality of frequency hopped, digital phase shift keying modulated tones are generated at a predetermined number of pseudo-randomly generated frequencies during a successive plurality of time frames. The phase of the tone at each frequency during a particular time frame is differentially modulated to one of a predetermined number of new phases using the phase of the tone at the same frequency in the previous frame as a reference. The tones are transmitted in the high frequency (HF) band, and then received and converted into digital signals. The digital signals are processed to determine the phase of the tone at each transmitted frequency. This may be accomplished by means of a Fourier transform filter. Finally the phase of each tone is compared to the phase of the tone received at the same frequency in the previous frame to decode the received signals, and hence accomplish the desired communications. The present invention provides for communications methods and apparatus which achieves HF skywave communications at high data rates with low bit error rate performance. The invention employs the use of frequency hopped digital phase shift keying and the convolutional coding that overcomes the dispersive nature of the HF channel and achieves the high data rate without resorting to channel equalization techniques. The performance of the modem of the present invention is not limited by the multimode multipath characteristics of the HF path. This is due to selection of a frequency dwell time that is significantly less than the multipath differential times of arrival, and a frame time of the waveform that is longer than the maximum multipath differential times of arrival.

9 Claims, 2 Drawing Sheets

HF HIGH DATA RATE MODEM

BACKGROUND

The present invention relates generally to digital modem devices, and more particularly to a high data rate digital modem for use in high frequency (HF) communications.

High frequency (HF) communications can occur by way of line-of-sight, ground wave, surface wave or skywave propagation. The dispersive nature of the skywave communication link make it the most difficult for use with high data rate transmission. Digital skywave modem communications devices for use in the HF band have been typically limited in terms of the data rate at which digital data may be transferred. HF communications involves the transmission and reception of digital data reflected from ionospheric layers which vary in their reflecting properties. In particular, different layers reflect with different efficiencies, and each respective layer introduces phase errors into the reflected data which are difficult, if not impossible, to predict or control. In addition there are problems of fading due to ionospheric changes, long delay multipaths, and symbol dispersion which cause interference that severely degrades communication performance.

Communication performance can be improved by employing channel adaptive equalization techniques. A number of adaptive equalization techniques have been proposed and some been implemented. However, adaptive equalization requires long training signals, and adaptation time is long, preventing the waveform to hop at a rapid rate. Such a relatively slow hopping communication technique is susceptible to frequency following interference that can cause severe degradation to communication link. High performance communication can also be achieved using the direct sequence pseudo-random noise (DSPN) technique, in which an information bit is modulated with a wideband chip stream. However, it has been determined that in order to compensate for the dispersion and fading due to intramodal multipath, a processing gain of about 40 dB is required. With such a gain requirement, a 9600 bit per second data rate would require a bandwidth of about 96 MHz, which far exceeds that achievable in HF skywave propagation, and would require a special design HF antenna that can support such a wide bandwidth. Consequently, there is a need for a more achievable technique to implement high speed HF communications.

A technique has been investigated for use with cellular communications, and is discussed in U.S. Pat. No. 4,189,677 entitled "Demodulator unit for Spread Spectrum Apparatus Utilized in a Cellular Mobile Communication System," and U.S. Pat. No. 4,222,115 entitled "Spread Spectrum Apparatus for Cellular Mobile Communication Systems." These patents discuss the adaptation of frequency hopped digital phase shift keying to the UHF band for use in digital cellular communications systems.

SUMMARY OF THE INVENTION

In order to overcome the limitations of conventional HF modem communications systems, the present invention provides for communications methods and apparatus which achieves HF skywave communications at high data rates with low bit error rate performance. One method of communicating using the high frequency (HF) band comprises the following steps. A predetermined plurality of frequency hopped, digital phase shift keying modulated tones are generated at a predetermined number of pseudo-randomly generated frequencies during a successive plurality of time frames. The phase of the tone at each frequency during a particular time frame is differentially modulated to one of a predetermined number of new phases using the phase of the tone at the same frequency in the previous frame as a reference. The tones are transmitted in the high frequency (HF) band, and then received and converted into digital signals. The digital signals are processed to determine the phase of the tone at each transmitted frequency. This may be accomplished by means of a Fourier transform filter. Finally, the phase of each tone is compared to the phase of the tone received at the same frequency in the previous frame to decode the received signals, and hence accomplish the desired communications.

Regarding the communication apparatus of the present invention, it comprises a transmitter which includes a phase generator that sequentially processes digital words that comprise information that is to be transmitted and converts the digital words into a series of phase encoded digital signals. Each successive phase encoded digital signal has a phase relationship with respect to the preceding phase encoded signal such that the currently processed phase component is incremented by the phase value associated with the digital word processed in the previous time frame. The transmitter also comprises a digital synthesizer which processes the phase encoded signals and sequentially generates a series of digital tones, each of which have individual frequencies randomly selected from a predetermined set of frequencies.

When employed in a skywave or surface wave propagation mode, for example, the transmitter also comprises an intermediate frequency to radio frequency (IF to RF) output section is provided to generate the HF carrier signals that are then transmitted by the communication apparatus. However, it is to be understood that the principles of the present invention are not limited to skywave or surface wave propagation, and transmission over dedicated transmission lines is also within the scope of its use.

In general, however, the receiver processes HF received signals and converts them into digitized I and Q samples. A Fourier transform filter processes the I and Q samples to generate phase information from each of the received tones. The phase information is then processed by a phase computation circuit to decode the phase information in the received signals. The phase information is extracted by subtracting the phase of the tone at a particular frequency in the preceding time frame from the phase of the tone in the currently processed frequency.

The high speed modem is capable of data transmission rates exceeding 2400 bits per second and approaching 9600 bits per second in the HF band. The invention employs the use of frequency hopped digital phase shift keying and the convolutional coding that overcomes the dispersive nature of the HF channel and achieves the high data rate without resorting to channel equalization techniques. The performance of the modem of the present invention is not limited by the multimode multipath characteristics of the HF path. This is due to selection of a frequency dwell time that is significantly less than the multipath differential times of arrival, and a frame time of the waveform that is longer than the maximum multipath differential times of arrival.

Because the present invention employs differential phase shift keying, no channel equalization training is required to operate in the HF multipath fading channel, and higher data rates are obtained than conventional HF modems employing channel equalization. In addition, the data rate, hop rate and hopping bandwidth may be combined in a variety of ways to provide flexible modulation characteristics.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
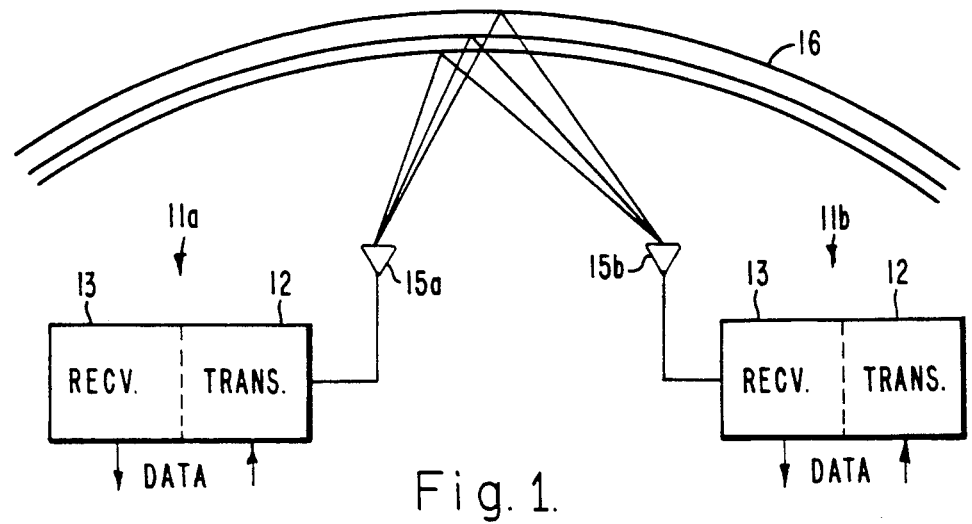
FIG. 1 illustrates an HF communications system employing a pair of HF modems in accordance with the principles of the present invention.

Referring to FIG. 1, a high frequency (HF) communications system 10 employing a pair of HF modems 11 in accordance with the principles of the present invention is shown. Each modem 11 includes a transmitter 12 and a receiver 13. The HF communications system 10 employs two modems 11a, 11b, one in the transmit mode and one in the receive mode. The signals transmitted by the transmitting modem 11a are modulated using the principles of the present invention and transmitted by means of HF skywave transmission from an antenna 15a that is reflected from the ionosphere, represented by the curved lines 16 in FIG. 1. The reflected signals are received by an antenna 15b of the receiving HF modem 11b and demodulated in accordance with the principles of the present invention.

Due to the nature of HF skywave propagation, different frequencies are reflected from different layers of the ionosphere 16 as shown in FIG. 1. The modem 11 of the present invention overcomes the limitations of conventional communications techniques by providing for a communications system that is relatively immune to multipath fading and the dispersive effects of the HF skywave channel.

Figure 2:
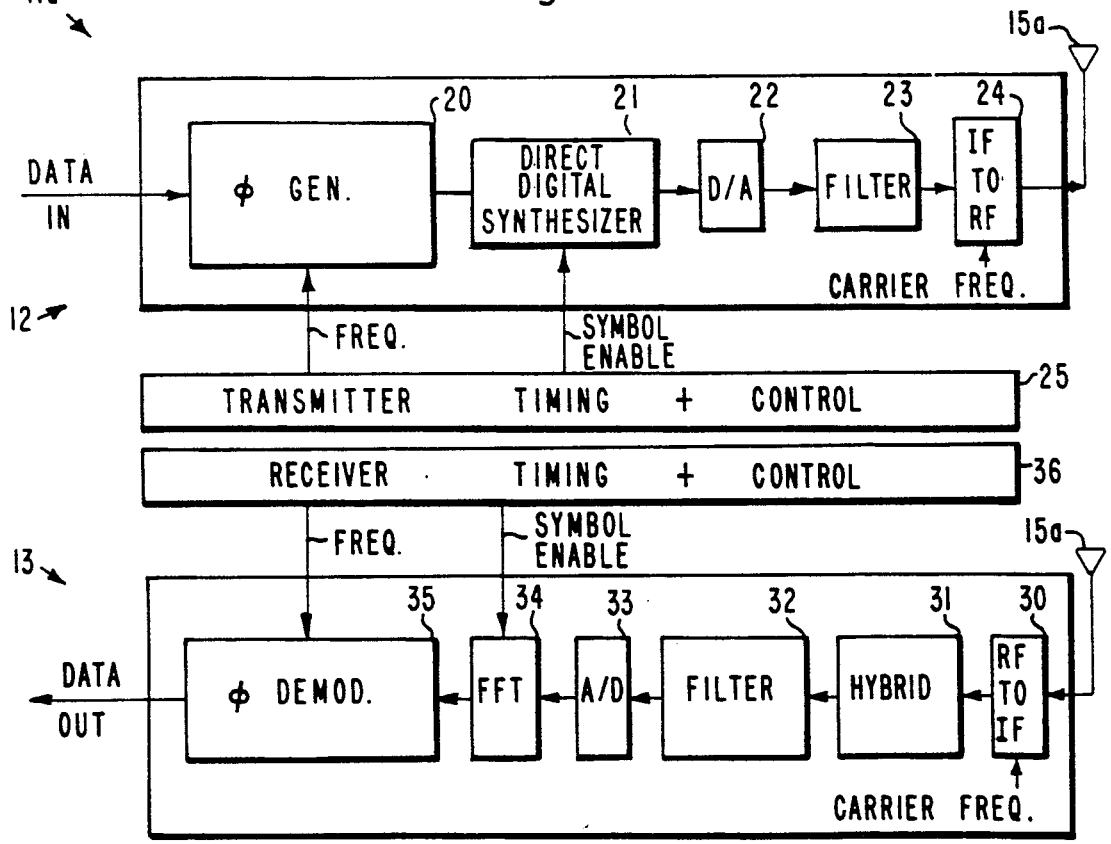
FIG. 2 shows a block diagram of an HF modem in accordance with the principles of the present invention.

Referring to FIG. 2, the modem 11a constructed in accordance with the principles of the present invention is shown. The modem 11 includes the transmitter 12 and the receiver 13. A data input port is provided for the transmitter 12 for processing data that is to be modulated and transmitted. The transmitter 12 comprises a phase generator 20, a direct digital synthesizer 21, a digital to analog converter 22, a bandpass filter 23, an intermediate to radio frequency section 24 and the antenna 15a, all of which are coupled together. A transmitter timing and control circuit 25 is coupled to the phase generator 20 and the digital synthesizer 21 to control the operation thereof.

The receiver 13 comprises a radio frequency to intermediate frequency section (IF to RF) 30, a 90° hybrid 31, an anti-aliasing filter 32, an analog to digital converter 33, a Fourier transform filter 34 which may comprise a fast Fourier transform (FFT) filter and a phase demodulator 35, coupled together. The radio frequency to intermediate frequency section 30 has its input coupled to the antenna 15a in order to received HF skywave signals transmitted by the transmitter 12 from the second modem 11b. A receiver timing and control circuit 36 is coupled to the phase demodulator 35 and the Fourier transform filter 34 to control the operation thereof.

Figure 3:
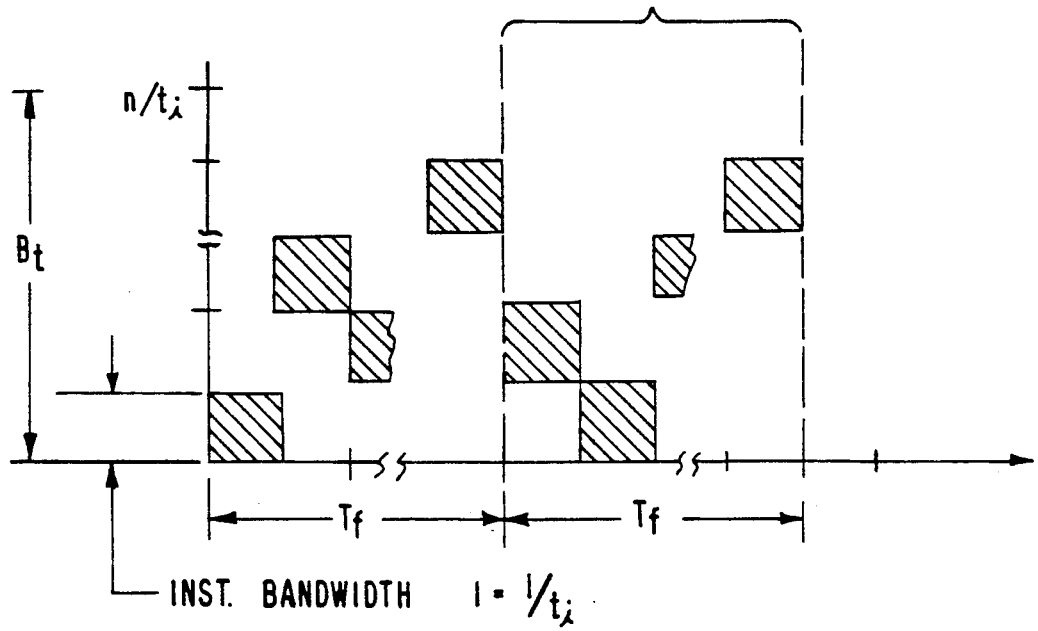
FIG. 3 shows the frequency hopping, differential phase shift keying waveform employed in the HF modem of FIG. 2.

FIG. 3 shows the frequency hopping, differential phase shift keying waveform employed in the HF modem 11 of FIG. 2. This waveform has a frame duration of $T_f$ and is comprised of n time chips. Each time chip contains a sinusoid of a duration $t_i$ at a frequency psudo-randomly selected in the frequency hop band. The frequencies are separated by multiples of the bandwidth, $1/t_i$, to ensure the orthogonality of the frequencies. The total contiguous occupied bandwidth of the waveform is $n/t_i$, where n is equal to the number of frequencies in the hop bandwidth, and n is equal to the number of time chips in the frame. The sinusoids at each frequency are differentially modulated with a M-phase differential phase shifted keyed symbol, M=2,4,8,16, and so on. The differential phase is referenced to the same frequency in the previous frame, in that the phase received on a frequency is demodulated by comparing its phase to the phase of the same frequency in the previous frame. The order of the frequencies within a frame are permuted for protection against frame rate ionospheric conditions or interference. If other than binary phase shift keying is used, then a Gray code is used to select the phase shift used. Table 1 below shows the Gray code for M=2, M=4 and M=8.

The M-phase modulation is used to increase the available data rate from a given total occupied bandwidth with a fixed instantaneous bandwidth. The data rate can be doubled from that achieved with bi-phase digital phase shift keying by using 4-phase digital phase shift keying or tripled using 8-phase digital phase shift keying.

The use of tracking frequencies within each frame may be employed to remove the deterministic time shift and Doppler shift resulting from the HF transmission reflected from the ionosphere. These tracking frequencies are used to cancel the deterministic phase and time errors that occur between frequency revisits. The frequencies used for the tracking function are randomly selected within the frequency hop bandwidth. The number of tracking frequencies used is dependent upon the magnitude of the deterministic errors that must be corrected. These errors are a function of the parameters of hop bandwidth ($B_t$) and frame time ($T_f$) and the HF environment in which the present invention is used. The hop bandwidth ($B_t$) and the frame time ($T_f$) are increased accordingly by the number of tracking frequencies used in the particular implementation.

The frame time ($T_f$) is an important parameter in the waveform design. If the frame time is too short, then the ionospheric delay time between multimode multipath components can cause intersymbol interference at the receiver. However, if the frame time is too long then the phase error introduced by the time delay between frequency revisits will increase the irreducible error rate.

In the frequency hopped, data phase shift keying technique of the present invention, each frequency dwell within a time frame contains one or more bits of information. The number of channel bits per frequency dwell is dependent upon the phase alphabet of the digital phase shift keying modulation used. If bi-phase modulation is used then one bit per frequency dwell is received and the channel bit rate is equal to the hop rate. If 4-phase digital phase shift keying modulation is used, then the channel bit rate is equal to twice the hop rate, and with 8-phase digital phase shift keying modulation, it triples the hop rate. In order to achieve reasonable performance, the required data rate should be less than the system channel bit rate so that error correction can be used to correct for the errors introduced by ionospheric conditions, noise and jammers. If other than binary phase modulation is used, then the use of the Gray code for the differential phase pattern is desired. In addition, if the ionospheric conditions indicate that large bandwidths will be fading, then interleaving of the data may be employed over a time range which is large in comparison to the fade duration, and error correction techniques can be used to improve communication performance. It is to be understood that any conventional forward error correction code can be used for this purpose to obtain low bit error rate performance.

Figure 4A:
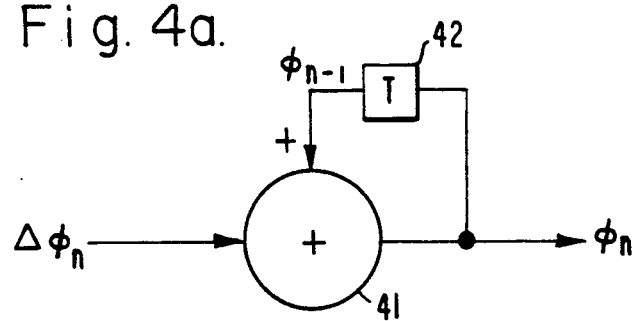
FIGS. 4a and 4b are diagrams illustrating the phase encoding and decoding arrangement, respectively, employed in the HF modem of FIG. 2.
Figure 4B:
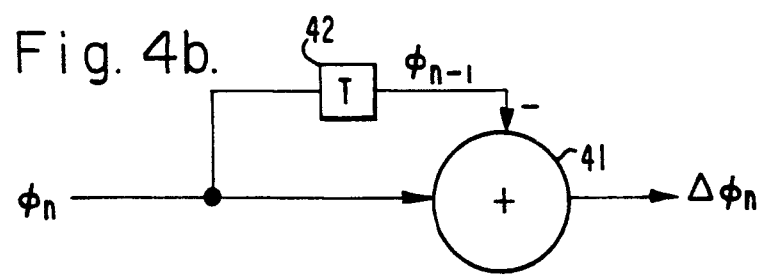

FIGS. 4a and 4b illustrate the phase encoding and decoding arrangement, respectively, employed in the modem 11 of FIG. 2. With reference to FIG. 4a, and the transmitter 12 of the modem 11, the phase encoding is accomplished in the phase generator 20 by means of an adder 41, and a delay register 42 which stores the previously computed phase. A word of data, comprising bits 1,1, −1, for example, is Gray encoded in accordance with the parameters of Table 1.

TABLE 1

| Gray codes | | | | | |
|---|---|---|---|---|---|
| M = 2 | | M = 4 | | M = 8 | |
| Word (bits) | Phase ($\Delta\phi n$) | Word (bits) | Phase ($\Delta\phi n$) | Word (bits) | Phase ($\Delta\phi n$) |
| 1 | 0 | 1, 1 | 0 | 1, 1, 1 | 0 |
| −1 | $\pi$ | 1, −1 | $\pi/2$ | 1, 1, −1 | $\pi/4$ |
|  |  | −1, −1 | $\pi$ | 1, −1, −1 | $\pi/2$ |
|  |  | −1, 1 | $3\pi/2$ | 1, −1, 1 | $3\pi/4$ |
|  |  |  |  | −1, −1, 1 | $\pi$ |
|  |  |  |  | −1, −1, −1 | $5\pi/4$ |
|  |  |  |  | −1, 1, −1 | $6\pi/4$ |
|  |  |  |  | −1, 1, 1 | $7\pi/4$ |

The digital word comprising bits 1, 1, −1 is converted to a phase of $\pi/4$. This phase is then added to the phase stored in the delay register 42 and applied to the direct digital synthesizer 21 which processes the phase information using the frequency hopped, phase shift keying waveform of FIG. 3. The arrangement of FIG. 4b is also employed in the phase demodulator 35 of the receiver 13. In this demodulator case, the phase information stored in the delay register 41 is subtracted from the applied phase information to generate a $\Delta\phi$ signal that is in turn Gray decoded to produce the correct digital word, for example bits 1, 1, −1.

The transmitter 12 of the present invention employs M-phase digital phase shift keying modulation and frequency hopping and operates as follows. Data that is to be transmitted, typically in the form of digital words are applied to the input port of the transmitter 12. The data is coded and then converted from its digital form into phase information by means of the Gray encoder. The phase information is added to the phase information of the preceding time frame in the phase generator 20. This phase information is then applied to the digital synthesizer which generates a digital sinusoidal tone at a randomly selected frequency and initiates the tone starting at the phase determined by the phase information provided thereto. This frequency hopped tone is then filtered and up-converted to generate the HF carrier, which is transmitted by way of HF skywave propagation.

The receiver 13 of the present invention employs the M-phase digital phase shift keying modulation and frequency hopping and operates as follows. The receiver 13 employs the radio frequency to intermediate frequency section 30 to receive the radio frequency signals and downconvert these signals to a suitable frequency. The 90° hybrid converts the received signals into I and Q samples in a conventional manner. The I and Q samples are filtered by the bandpass filter 32 and converted to digital signals by the analog to digital converter 33. The Fourier transform filter 34 takes an n point Fourier transform of the I and Q samples and stores them for future use as a reference phase for the next frame. A sample is selected that is associated with a particular frequency bin. The phase of the complex sample is computed. The phase of the previously stored complex sample is then subtracted from the phase of the currently processed sample to generate a signal indicative of the phase difference, $\Delta\phi$, which is representative of the phase of the data originally transmitted by the transmitter 12. This phase difference signal $\Delta\phi$ is then converted to a digital word by a Gray decoder in accordance with the parameters given in Table 1. The digital word is converted to information data by means of an error correction decoder, for example.

To more fully explain the decoding technique employed in the present invention, the following equations explain the computations performed in the Fourier transform filter 34 and phase demodulator 35. Consider, for example a signal at frequency number 52 ($f_{52}$) during successive frame times. These are identified as time frame n-1 and n. The Fourier transform filter 34 samples the signal at frequency number 52 during the successive frame times and computes the Fourier transforms defined by the equations:

$$Z_{52}{}^{(n)} = |Z_{52}{}^{(n)}| < \phi_n = Z_{52}{}^{(n)} e^{j\phi_n}$$

and $$Z_{52}{}^{(n-1)} = |Z_{52}{}^{(n-1)}| < \phi_{n-1} = Z_{52}{}^{(n-1)} e^{j\phi_{n-1}}$$

and therefore $$\Delta\phi_n = \arg(Z_{52}{}^{(n)}.Z_{52}{}^{*(n-1)}),$$

and $$\Delta\phi_n = \phi_n - \phi_{n-1}.$$

Thus, there has been described a new and improved method and apparatus for achieving high frequency (HF) modem communications. The present invention employs frequency hopped, differential phase shift keying modulation to eliminate problems associated with the HF skywave band. No channel equalization training is required to operate in the HF multipath fading channel, and higher data rates are obtained than conventional HF modems employing channel equalization. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A high frequency modem comprising:
 a transmitter comprising (a) phase generator means for processing digital words that comprise data that is to be transmitted and for converting the digital words into a series of corresponding phase encoded digital signals, each successive phase encoded digital signal having a phase relationship with respect to the preceding phase encoded signal such that the currently processed signal has its phase component incremented by the phase value of the preceding processed digital word; and (b) digital synthesizing means coupled to the phase generator means for processing the phase encoded signals and generating a series of digital signals that have individual frequencies randomly selected from a predetermined set of frequencies, and whose respective phases correspond to the phases of the respective phase encoded signals, and wherein the frequency dwell time is significantly less than the multipath differential times of arrival, and such that further occurrences of the same frequency occur no more frequently than the maximum multipath differential times of arrival; and
 a receiver comprising demodulation means for demodulating the frequency hopped, digital phase shift keying signals and providing digital words which comprise the information transmitted by the transmitter.

2. Apparatus for communicating using the high frequency (HF) band, said apparatus comprising:
 digital synthesizing means for generating a predetermined plurality of frequency hopped, digital phase shift keying modulated tones at a predetermined number of psuedo-randomly generated frequencies during each frame, wherein the phase of the tone at each frequency during a particular frame is differentially modulated to one of a predetermined number of new phases using the phase of the tone at the same frequency in the previous frame as a reference, and wherein each tone has a dwell time that is significantly less than the multipath differential times of arrival, and wherein the frame time is longer than the maximum multipath differential times of arrival;
 transmitting means for transmitting tones in the high frequency (HF) band;
 receiving means for receiving transmitted tones;
 analog to digital conversion means for converting received tones into digital signals;
 filter means for processing the digital signals by means of a Fourier transform filter to determine the phase of the tone at each transmitted frequency; and
 phase generation means for comparing the phase of a selected tone at a particular frequency to the phase of the tone received at the same frequency in the previous frame to decode the received signals.

3. A transmitter comprising:
 phase generator means for processing digital words that comprise data that is to be transmitted and for converting the digital words into a series of corresponding phase encoded digital signals, each successive phase encoded digital signal having a phase relationship with respect to the preceding phase encoded signal such that the currently processed signal has its phase component incremented by the phase value of the preceding processed digital word; and
 digital synthesizing means coupled to the phase generator means for processing the phase encoded signals and generating a series of digital signals that have individual frequencies randomly selected from a predetermined set of frequencies, and whose respective phases correspond to the phases of the respective phase encoded signals, and wherein each signal has a dwell time that is significantly less than the multipath differential times of arrival, and such that further occurrences of the same frequency occur no more frequently than the maximum multipath differential times of arrival.

4. A receiver comprising:
 demodulation means for demodulating successive frames of frequency hopped, digital phase shift keying signals, wherein each signal has a dwell time that is significantly less than the multipath differential times of arrival, and wherein the frame time is longer than the maximum multipath differential times of arrival, and for providing digital words that comprise encoded information, said demodulation means comprising:
 analog to digital conversion means for converting received tones into digital signals;
 filter means for processing the digital signals by means of a Fourier transform filter to determine the phase of the tone at each transmitted frequency; and
 phase generation means for comparing the phase of a selected tone at a particular frequency to the phase of the tone received at the same frequency in the previous frame to decode the received signals.

5. A method of transmitting and receiving data using the HF frequency bandwidth, said method comprising the steps of:
 generating a plurality of digital words that comprise data which is to be transmitted;
 converting the digital words into a series of signals having uniquely encoded phase information that corresponds to each digital word;
 generating a plurality of digital signals which each have a frequency randomly selected from a predetermined set of frequencies, wherein each signal has a dwell time that is significantly less than the multipath differential times of arrival, and such that further occurrences of the same frequency occur no more frequently than the maximum multipath differential times of arrival;

modulating the signals having the randomly selected frequency with the uniquely encoded phase information;

transmitting the modulated signals;

receiving the transmitted signals;

converting the received signals into digital samples;

extracting the phase information from the digital samples; and converting the phase information into digital signals corresponding to the digital words transmitted by the transmitter.

6. A method of transmitting information using the HF frequency band, said method comprising the steps of:

sequentially processing input data comprising a plurality of digital words which are to be transmitted;

sequentially generating individual phase encoded signals that correspond to the digital words;

sequentially generating HF signals having randomly selected frequencies within a predetermined frequency bandwidth that are synthesized from a predetermined set of of frequencies, wherein each signal has a dwell time that is significantly less than the multipath differential times of arrival, and such that further occurrences of the same frequency occur no more frequently than the maximum multipath differential times of arrival; and sequentially modulating the HF signals such that the phase of a selected HF signal is comprised of the phase of the previously transmitted HF signal at that frequency plus the phase of the phase encoded signal.

7. A method of communicating using the high frequency (HF) band, said method comprising the steps of:

generating a plurality of digital words that comprise data which is to be transmitted;

converting the digital words into a series of signals having uniquely encoded phase information that corresponds to each digital word;

selecting a set of frequencies within the HF frequency band;

randomly permuting the set of frequencies on each time frame to provide modulated signals, wherein each signal has a dwell time that is significantly less than the multipath differential times of arrival, and such that further occurrences of the same frequency occur no more frequently than the maximum multipath differential times of arrival;

transmitting the modulated signals;

receiving the transmitted signals;

converting the received signals into digital samples;

extracting the phase information from the digital samples; and converting the phase information into digital signals corresponding the digital words transmitted by the transmitter.

8. A method of communicating using the high frequency (HF) band, said method comprising the steps of:

modulating signals that are to be communicated using a predetermined plurality of successive frames of frequency hopped, digital phase shift keying tones at a predetermined number of pseudo-randomly generated frequencies during each frame, wherein each signal has a dwell time that is significantly less than the multipath differential times of arrival, and wherein the frame time is longer than the maximum multipath differential times of arrival, and wherein the phase of the tone at each frequency during a particular frame is differentially modulated to one of a predetermined number of new phases using the phase of the tone at the same frequency in the previous frame as a reference;

transmitting the modulated signals using high frequency (HF) skywave propagation;

receiving the transmitted modulated signals;

converting received modulated signals into digital signals;

processing the digital signals to determine the phase of the modulated signal at each transmitted frequency; and comparing the phase to the phase of the modulated signal received at the same frequency in the previous frame to demodulate the received signals.

9. The method of claim 8 wherein the processing step comprises the step of:

processing the digital signals by means of a Fourier transform to determine the phase of the modulated signal at each transmitted frequency.

* * * * *